United States Patent
Oohira

(10) Patent No.: US 8,780,580 B2
(45) Date of Patent: Jul. 15, 2014

(54) DISPLAY DEVICE

(75) Inventor: Eiji Oohira, Mobara (JP)

(73) Assignee: Japan Display Inc., Tokyo (JP)

( * ) Notice: Subject to any disclaimer, the term of this patent is extended or adjusted under 35 U.S.C. 154(b) by 74 days.

(21) Appl. No.: 13/491,859

(22) Filed: Jun. 8, 2012

(65) Prior Publication Data

US 2012/0314383 A1 Dec. 13, 2012

(30) Foreign Application Priority Data

Jun. 10, 2011 (JP) .................. 2011-130000

(51) Int. Cl.
*H05K 1/14* (2006.01)

(52) U.S. Cl.
USPC .......................... 361/785; 361/749

(58) Field of Classification Search
CPC ......... H05K 1/14; H05K 1/141; H05K 1/144; H05K 2201/10189; H01R 9/096
USPC ............................ 361/749–751, 785; 174/254
See application file for complete search history.

(56) References Cited

U.S. PATENT DOCUMENTS

| | | | | |
|---|---|---|---|---|
| 4,364,619 A * | 12/1982 | Inayat-Khan | ................... | 439/67 |
| 7,772,501 B2 * | 8/2010 | Ueda et al. | .................... | 174/254 |
| 2005/0088830 A1 * | 4/2005 | Yumoto et al. | ................ | 361/749 |
| 2005/0195578 A1 * | 9/2005 | Chang et al. | ................... | 361/749 |
| 2006/0203140 A1 * | 9/2006 | Kim | ................. | 349/58 |
| 2008/0074408 A1 * | 3/2008 | Jang | ............... | 345/206 |
| 2008/0180585 A1 * | 7/2008 | Kubota et al. | ................... | 349/12 |
| 2009/0207368 A1 * | 8/2009 | Chuang | .......................... | 349/150 |
| 2010/0085320 A1 | 4/2010 | Kuwajima et al. | | |
| 2010/0302478 A1 * | 12/2010 | Nakagawa et al. | ............. | 349/62 |

FOREIGN PATENT DOCUMENTS

| JP | 2010-85923 | 4/2010 |
|---|---|---|
| KR | 10-2007-0025033 | 3/2007 |

OTHER PUBLICATIONS

Office Action for corresponding Korean Application No. KR 10-2012-61297, dated Sep. 26, 2013, and partial English translation thereof.

* cited by examiner

*Primary Examiner* — Jenny L Wagner
*Assistant Examiner* — Michael P McFadden
(74) *Attorney, Agent, or Firm* — Antonelli, Terry, Stout & Kraus, LLP.

(57) ABSTRACT

A display device includes a second flexible printed circuit board electrically connected to interface terminals, a display panel joined to a first flexible printed circuit board, and a sub panel joined to the second flexible printed circuit board. The second flexible printed circuit board includes an upper end portion which extending sideward from an end portion of the sub panel above the first flexible printed circuit board, an outward bent portion bent from the upper end portion in a return direction, an intermediate portion extending from the outward bent portion such that the intermediate portion passes an electrically connecting portion with the first flexible printed circuit board below the first flexible printed circuit board, an inward bent portion bent from the intermediate portion in a return direction toward the electrically connecting portion, and a lower end portion extending from the inward bent portion and reaching the electrically connecting portion.

5 Claims, 3 Drawing Sheets

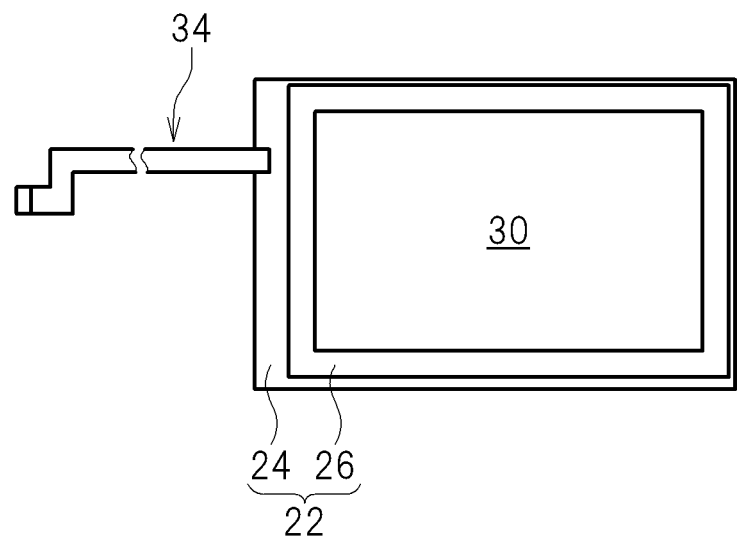
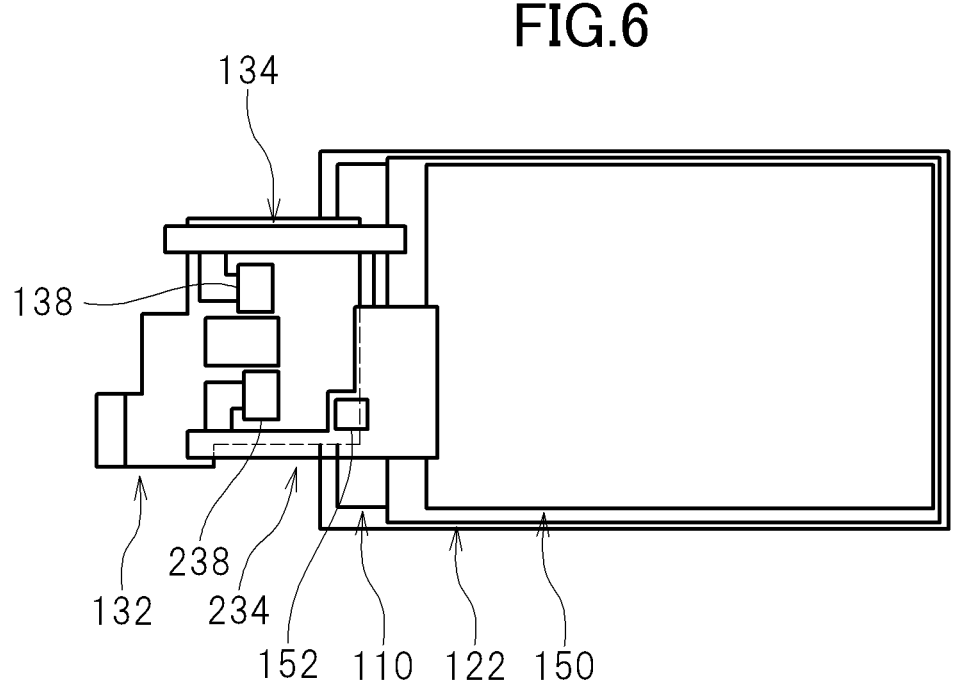

DISPLAY DEVICE

CROSS-REFERENCE TO RELATED APPLICATION

The present application claims priority from Japanese application JP2011-130000 filed on Jun. 10, 2011, the contents of which are hereby incorporated by reference into this application.

BACKGROUND OF THE INVENTION

1. Field of the Invention

The present invention relates to a display device including a sub panel.

2. Description of the Related Art

There has been known a case where a display device uses (Flexible Printed Circuits) (FPCs). JP 2010-85923 A discloses a case where a liquid crystal display device uses an FPC for electrical connection with a liquid crystal display panel and an FPC for electrical connection with a touch panel. Further, there has been also known a technique where an FPC is bent back to a back side of a backlight for satisfying a demand for miniaturization of a display device.

By connecting one FPC to another FPC in using plural FPCs, a group of interface terminals can be collectively arranged at one place so that the number of connectors can be decreased whereby the number of mounting steps can be also decreased. In this case, however, in bending the plural FPCs to a back surface of a backlight in a state where the FPCs overlap with each other, due to the difference in bend radius between the FPCs, a tensile stress is generated in the outside bent FPC. It may be possible to make the outside bent FPC longer than the inside bent FPC to avoid the generation of the tensile stress generated due to the difference in bend radius. In this case, however, the FPC is already in a bent state before bending and hence, a shearing force is generated in a joining portion between the panel and the FPC.

SUMMARY OF THE INVENTION

It is an object of the invention to provide a display device where a group of interface terminals are collected at one place while decreasing adverse influence exerted by a stress.

(1) According to one aspect of the invention, there is provided a display device which includes: a first flexible printed circuit board having a group of interface terminals; a second flexible printed circuit board which is joined to the first flexible printed circuit board and is electrically connected to at least one terminal of the group of interface terminals; a display panel which is electrically connected and joined to the first flexible printed circuit board; and a sub panel which is arranged on the display panel in an overlapping manner, and is electrically connected and joined to the second flexible printed circuit board, wherein the first flexible printed circuit board extends sideward from an end portion of the display panel, is bent in a return direction, and extends to an area below the display panel, and the second flexible printed circuit board includes: an upper end portion which extends sideward from an end portion of the sub panel above the first flexible printed circuit board; an outward bent portion which is bent from the upper end portion in a return direction; an intermediate portion which extends from the outward bent portion in such a manner that the intermediate portion passes an electrically connecting portion with the first flexible printed circuit board below the first flexible printed circuit board; an inward bent portion which is bent from the intermediate portion in a return direction toward the electrically connecting portion; and a lower end portion which extends from the inward bent portion and reaches the electrically connecting portion.

According to the invention, the second flexible printed circuit board has the outward bent portion on a side close to the sub panel and the inward bent portion on a side away from the sub panel (side close to the electrically connecting portion). Accordingly, in a state where the first flexible printed circuit board is held in a straight shape before bending, the outward bent portion can be stretched straightly while the inward bent portion is bent. As a result, the generation of a shearing force in a joining portion between the sub panel and the second flexible printed circuit board can be suppressed and hence, the group of interface terminals can be collected at one place while decreasing the adverse influence exerted by the stress.

(2) According to the display device having the constitution (1), the outward bent portion and the inward bent portion may be positioned such that a projecting side of bending of the outward bent portion and a projecting side of bending of the inward bent portion are directed opposite to each other, the intermediate portion may extend at a position displaced from the electrically connecting portion so as to avoid overlapping of the intermediate portion with the electrically connecting portion, and the lower end portion may have a portion extending in a direction which intersects with a direction that the intermediate portion extends.

(3) According to the display device having the constitution (1) or (2), the inward bent portion is bent from the lower end portion toward the intermediate portion in a direction toward a side that the inward bent portion is away from the display panel.

(4) According to the display device having any one of constitutions (1) to (3), the display device may further include a connector which is mounted on the first flexible printed circuit board and is electrically connected to at least one terminal of the group of interface terminals, and the connector may constitute the electrically connecting portion.

BRIEF DESCRIPTION OF THE DRAWINGS

FIG. 5 is a view showing a parallax barrier liquid crystal panel and the second flexible printed circuit board before bending which is joined to the parallax barrier liquid crystal panel; and FIG. 6 is a plan view for explaining a modification of the display device shown in FIG. 2.

DETAILED DESCRIPTION OF THE INVENTION

Figure 1:
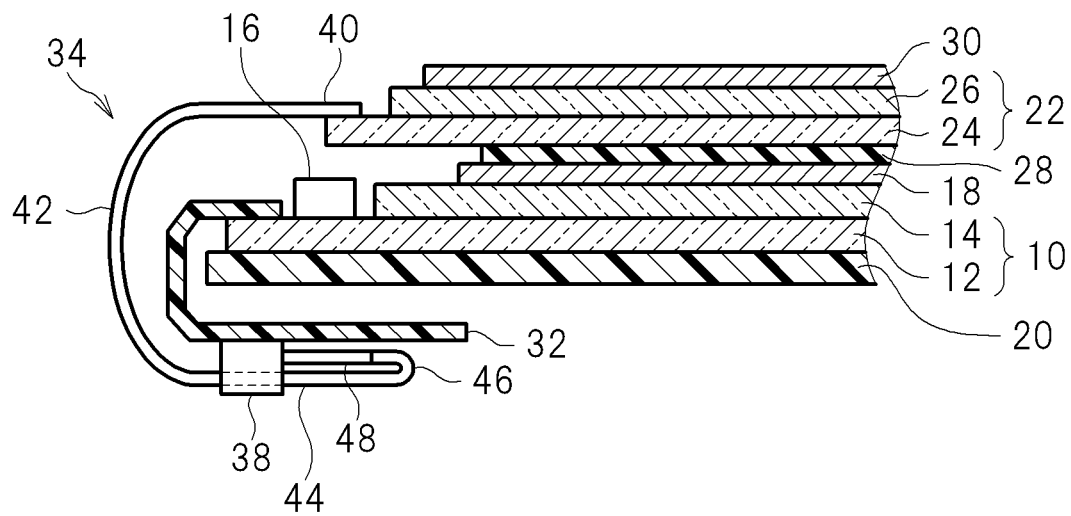
FIG. 1 is a cross-sectional view showing a display device according to an embodiment of the invention.

Hereinafter, an embodiment of the invention is explained in conjunction with drawings. FIG. 1 is a cross-sectional view showing a display device according to the embodiment of the invention. The display device includes a liquid crystal display panel 10. The liquid crystal display panel 10 is one example of a display panel, and may be replaced with another display panel such as an organic EL (Electro Luminescence) display panel.

The liquid crystal display panel 10 may preferably be a TN (Twisted Nematic) liquid crystal display panel, an STN (Super Twisted Nematic) liquid crystal display panel, a VA (Vertical Alignment) liquid crystal display panel, an IPS (In-Plane Switching) liquid crystal display panel or the like. However, the structure and a liquid crystal drive method of the liquid crystal display panel 10 are not limited. The liquid crystal display panel 10 includes a pair of transparent substrates 12, 14 made of glass or the like, and liquid crystal not shown in the drawing is sandwiched between both substrates. One substrate 12 is a TFT (Thin Film Transistor) substrate, and the other substrate 14 is a color filter substrate. An integrated circuit chip 16 is mounted on the substrate 12. A polarizer 18 is laminated to the substrates 12, 14 (at least to a display screen on which an image is displayed). The liquid crystal display panel 10 is supported on a frame 20 made of a resin or the like.

The liquid crystal display device according to this embodiment can perform a stereoscopic image display. To be more specific, the liquid crystal display device allows a viewer to visually recognize different two-dimensional images on his left and right eyes respectively so that the brain of the viewer builds up a three-dimensional space based on these two two-dimensional images. Accordingly, an image for a left eye and an image for a right eye are displayed on the liquid crystal display panel 10. Further, the display device includes a parallax barrier liquid crystal panel 22. The parallax barrier liquid crystal panel 22 is one example of a sub panel, and may be replaced with another sub panel such as a touch panel.

The parallax barrier liquid crystal panel 22 is provided for allowing a viewer to stereoscopically view an image with his naked eyes by separating an image for a left eye and an image for a right eye displayed on the liquid crystal display panel 10 from each other using a parallax barrier method. The parallax barrier method is a method by which only an image for a left eye is projected on a left eye and only an image for a right eye is projected on a right eye by overlapping a filter having vertical stripes (parallax barrier) to the display screen for displaying an image.

The parallax barrier liquid crystal panel 22 may be a TN (Twisted Nematic) liquid crystal panel, an STN (Super Twisted Nematic) liquid crystal panel, a VA (Vertical Alignment) liquid crystal panel, an IPS (In-Plane Switching) liquid crystal panel or the like. However, the structure and a liquid crystal drive method of the parallax barrier liquid crystal panel 22 are also not limited. The parallax barrier liquid crystal panel 22 also includes a pair of transparent substrates 24, 26 made of glass or the like, and liquid crystal not shown in the drawing is sandwiched between both substrates 24, 26. One substrate 24 is a TFT (Thin Film Transistor) substrate.

The parallax barrier liquid crystal panel 22 which is one example of the sub panel is arranged on the liquid crystal display panel 10 (to be more specific, a display screen side) which is one example of a display panel in an overlapping manner. The parallax barrier liquid crystal panel 22 and the liquid crystal display panel 10 are adhered to each other with an adhesion layer 28 interposed therebetween. It is preferable that the adhesion layer 28 has optical transmissivity and be transparent.

A polarizer 30 is laminated to the substrate 26 of the parallax barrier liquid crystal panel 22 on a side opposite to the liquid crystal display panel 10. On the other hand, the adhesion layer 28 is adhered to the substrate 24 of the parallax barrier liquid crystal panel 22 on a liquid crystal display panel 10 side. The adhesion layer 28 is adhered to the polarizer 18 of the liquid crystal display panel 10 on a parallax barrier liquid crystal panel 22 side. The polarizer 18 functions not only as a polarizer of the liquid crystal display panel 10 on a parallax barrier liquid crystal panel 22 side but also as a polarizer of the parallax barrier liquid crystal panel 22 on a liquid crystal display panel 10 side. That is, one polarizer 18 is used in common by the liquid crystal display panel 10 and the parallax barrier liquid crystal panel 22.

Figure 2:
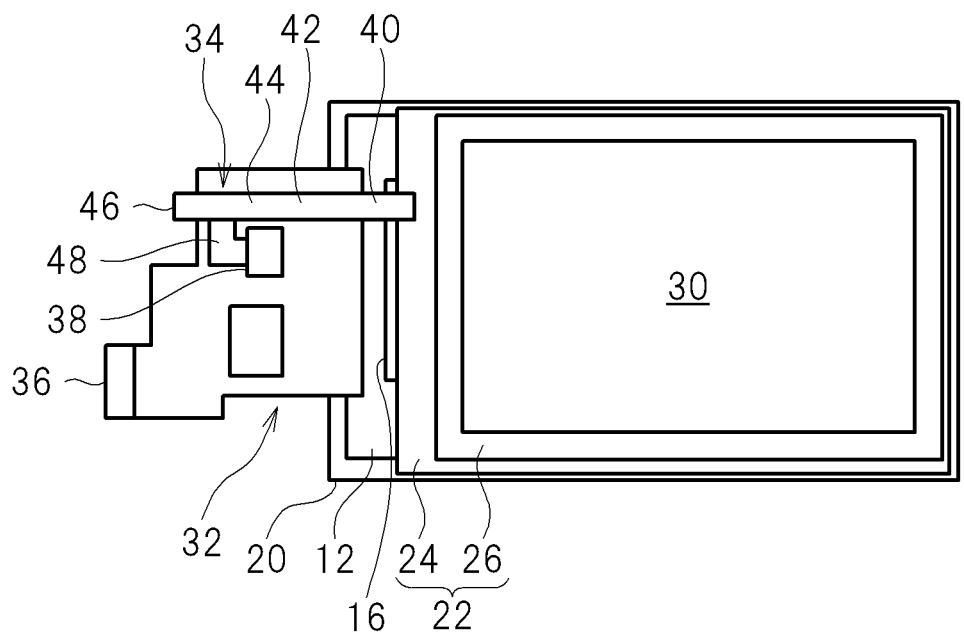
FIG. 2 is a plan view showing a display device having a first flexible printed circuit board and a second flexible printed circuit board before bending the flexible printed circuit boards.
Figure 3:
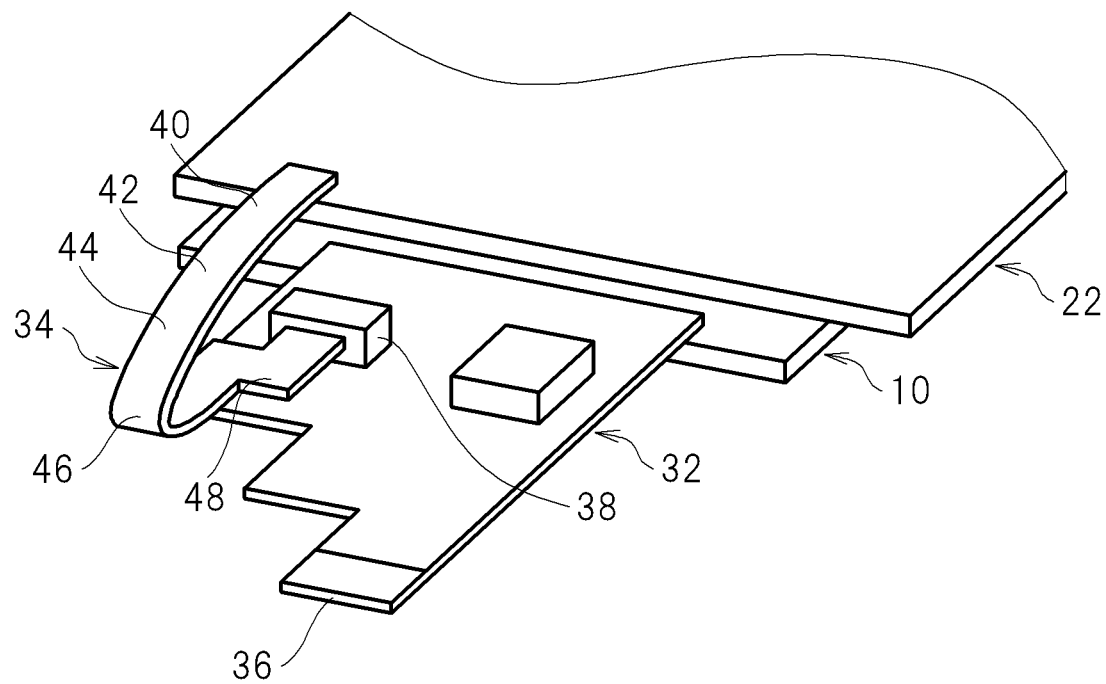
FIG. 3 is a perspective view showing the schematic constitution of the display device shown in FIG. 2.

As shown in FIG. 1, the display device includes a first flexible printed circuit board 32 and a second flexible printed circuit board 34 which are bent respectively. The first flexible printed circuit board 32 extends sideward from an end portion of the liquid crystal display panel 10, is bent in the return direction, and extends to an area below the liquid crystal display panel 10. FIG. 2 is a plan view showing the display device having the first flexible printed circuit board 32 and the second flexible printed circuit board 34 before bending the printed circuit boards 32, 34. FIG. 3 is a perspective view showing the schematic constitution of the display device shown in FIG. 2.

Figure 4:
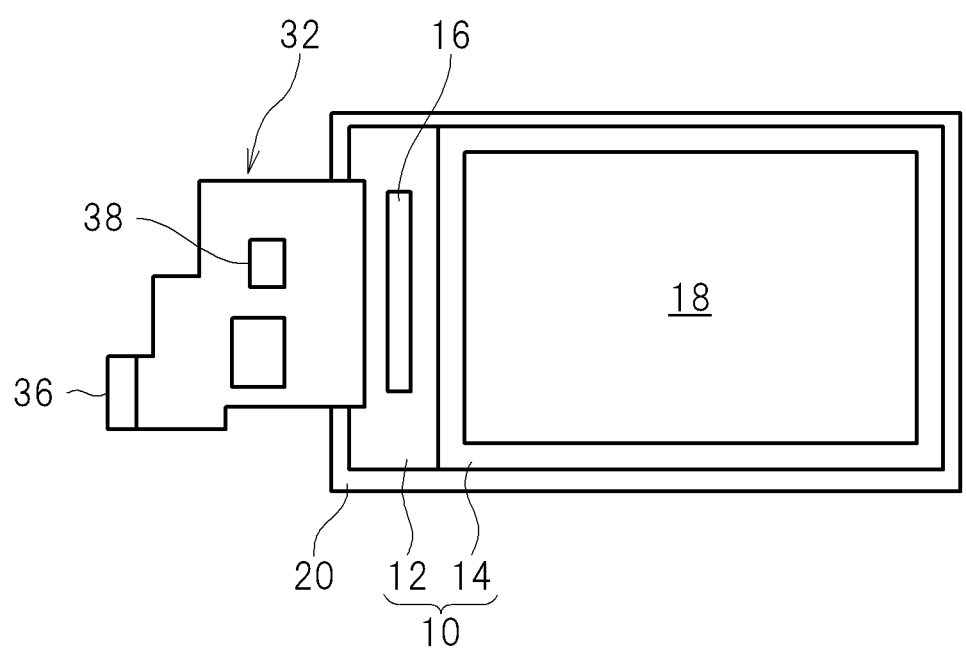
FIG. 4 is a view showing a liquid crystal display panel and the first flexible printed circuit board before bending which is joined to the liquid crystal display panel.

FIG. 4 is a view showing the liquid crystal display panel 10 and the first flexible printed circuit board 32 which is joined to the liquid crystal display panel 10. The first flexible printed circuit board 32 has a group of interface terminals 36. The liquid crystal display panel 10 which is one example of a display panel is electrically connected to the first flexible printed circuit board 32. The liquid crystal display panel 10 is electrically connected to at least one terminal of the group of interface terminals 36 through a wiring pattern not shown in the drawing which is formed on the first flexible printed circuit board 32.

Various electronic parts including a connector 38 are mounted on the first flexible printed circuit board 32. The connector 38 is electrically connected to at least one terminal of the group of interface terminals 36. For establishing such an electrical connection between at least one terminal of the group of interface terminals 36 and the connector 38, the wiring pattern not shown in the drawing is formed on the first flexible printed circuit board 32.

FIG. 5 is a view showing the parallax barrier liquid crystal panel 22 and the second flexible printed circuit board 34 which is joined to the parallax barrier liquid crystal panel 22. The parallax barrier liquid crystal panel 22 which is one example of the sub panel is electrically connected and joined to the second flexible printed circuit board 34 (a wiring pattern not shown in the drawing).

As shown in FIG. 3, the second flexible printed circuit board 34 is joined to the first flexible printed circuit board 32. Further, the second flexible printed circuit board 34 is electrically connected to at least one terminal of the group of interface terminals 36 of the first flexible printed circuit board 32. For establishing such an electrical connection, a wiring pattern not shown in the drawing is also formed on the second flexible printed circuit board 34. The wiring pattern not shown in the drawing of the first flexible printed circuit board 32 and the wiring pattern not shown in the drawing of the second flexible printed circuit board 34 are electrically connected with each other. The electrical connection between the second flexible printed circuit board 34 and the first flexible printed circuit board 32 is established through the connector 38. That is, the connector 38 constitutes an electrically connecting portion. Here, as a modification, both the second flexible printed circuit board 34 and the first flexible printed circuit board 32 may be electrically connected with each other by soldering.

As shown in FIG. 1, the second flexible printed circuit board 34 includes an upper end portion 40, an outward bent portion 42, an intermediate portion 44, an inward bent portion 46 and a lower end portion 48, wherein these portions are arranged in order in the direction away from the parallax barrier liquid crystal panel 22.

The upper end portion 40 is a portion which extends sideward from an end portion of the parallax barrier liquid crystal panel 22 above the first flexible printed circuit board 32. The outward bent portion 42 is a portion which is bent from the upper end portion 40 in the return direction. The intermediate portion 44 is a portion which extends from the outward bent portion 42 in such a manner that the intermediate portion 44 passes the connector 38 below the first flexible printed circuit board 32. As shown in FIG. 2, the intermediate portion 44 extends at a position displaced from the connector 38 so as to avoid overlapping with the electrically connecting portion. The inward bent portion 46 is a portion which is bent from the intermediate portion 44 in the return direction toward the electrically connecting portion. The outward bent portion 42 and the inward bent portion 46 are positioned such that a projecting side of bending of the outward bent portion 42 and a projecting side of bending of the inward bent portion 46 are directed opposite to each other. As shown in FIG. 3, the lower end portion 48 is a portion which extends from the inward bent portion 46 and reaches the connector 38. The lower end portion 48 includes a portion extending in the direction which intersects with the direction that the intermediate portion 44 extends. As shown in FIG. 1, the inward bent portion 46 is bent from the lower end portion 48 toward the intermediate portion 44 in a direction toward a side that the inward bent portion 46 is away from the liquid crystal display panel 10.

According to this embodiment, the second flexible printed circuit board 34 includes the outward bent portion 42 on a side close to the parallax barrier liquid crystal panel 22 which is one example of the sub panel, and includes the inward bent portion 46 on a side away from the parallax barrier liquid crystal panel 22 (close to the electrically connecting portion). Accordingly, in a state where the first flexible printed circuit board 32 is held in a straight shape before bending (see FIG. 3), the outward bent portion 42 can be stretched straightly while the inward bent portion 46 is bent. Accordingly, it is possible to suppress the generation of a shearing force in a joining portion between the parallax barrier liquid crystal panel 22 and the second flexible printed circuit board 34 and hence, the group of interface terminals 36 can be collected at one place while decreasing the adverse influence exerted by a stress.

FIG. 6 is a plan view for explaining a modification of the display device according to the embodiment of the invention. In FIG. 6, in the same manner as the constitution shown in FIG. 2, a first flexible printed circuit board 132 and a second flexible printed circuit board 134 are shown in a stretched manner.

In this modification, plural sub panels are arranged on a display panel in an overlapping manner. That is, a parallax barrier liquid crystal panel 122 (sub panel) is arranged on the liquid crystal display panel 110 (display panel) in an overlapping manner, and a touch panel (sub panel) 150 is further arranged on the parallax barrier liquid crystal panel 122 in an overlapping manner. The detailed constitution of the touch panel 150 is well-known and hence, the explanation of the constitution is omitted.

The detailed contents of the liquid crystal display panel 110, the first flexible printed circuit board 132 which is joined to the liquid crystal display panel 110, the parallax barrier liquid crystal panel 122, and the second flexible printed circuit board 134 which is joined to the parallax barrier liquid crystal panel 122 correspond to the detailed contents of the liquid crystal display panel 10, the first flexible printed circuit board 32, the parallax barrier liquid crystal panel 22, and the second flexible printed circuit board 34 described above.

Another second flexible printed circuit board 234 is joined to the touch panel 150. The detailed contents such as a shape, functions and bending positions of the second flexible printed circuit board 234 correspond to the detailed contents of the second flexible printed circuit board 134 which is joined to the parallax barrier liquid crystal panel 122. That is, the second flexible printed circuit board 234 also includes the same structure as the above-mentioned structure consisting of the upper end portion 40, the outward bent portion 42, the intermediate portion 44, the inward bent portion 46 and the lower end portion 48.

Plural connectors 138, 238 are mounted on the first flexible printed circuit board 132. The plural second flexible printed circuit board 134, 234 are connected to the plural connectors 138, 238 respectively. Here, an integrated circuit chip 152 for controlling the touch panel 150 is mounted on the second flexible printed circuit board 234.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
   a first flexible printed circuit board having a group of interface terminals;
   a second flexible printed circuit board which is joined to the first flexible printed circuit board and is electrically connected to at least one terminal of the group of interface terminals;
   a display panel which is electrically connected and joined to the first flexible printed circuit board; and
   a sub panel which is arranged on an upper surface of the display panel in an overlapping manner, and is electrically connected and joined to the second flexible printed circuit board, wherein
   the first flexible printed circuit board extends sideward from an end portion of the display panel, is bent in a return direction toward the display panel, and extends to an area below a lower surface of the display panel, and
   the second flexible printed circuit board includes: an upper end portion which extends sideward from an end portion of the sub panel above the first flexible printed circuit board; an outward bent portion which is bent from the upper end portion in a return direction toward the display panel; an intermediate portion which extends from the outward bent portion in such a manner that the intermediate portion passes an electrically connecting portion with the first flexible printed circuit board below the first flexible printed circuit board; an inward bent portion which is bent from the intermediate portion in a return direction toward the outward bent portion and toward the electrically connecting portion; and a lower end portion which extends from the inward bent portion and reaches the electrically connecting portion.

2. The display device according to claim 1, wherein the outward bent portion and the inward bent portion are positioned such that a projecting side of bending of the outward bent portion and a projecting side of bending of the inward bent portion are directed opposite to each other, the intermediate portion extends at a position displaced from the electrically connecting portion so as to avoid overlapping of the intermediate portion with the electrically connecting portion, and the lower end portion includes a portion extending in a direction which intersects with a direction that the intermediate portion extends.

3. The display device according to claim 1, wherein the inward bent portion is bent from the lower end portion toward the intermediate portion in a direction toward a side that the inward bent portion is away from the display panel.

4. The display device according to claim 1, wherein the display device further comprises a connector which is mounted on the first flexible printed circuit board and is electrically connected to at least one terminal of the group of interface terminals, and the connector constitutes the electrically connecting portion.

5. The display device according to claim 1, wherein the sub panel arranged on the upper surface of the display panel is one of a sub display panel and a touch panel.

\* \* \* \* \*